March 20, 1951 A. F. JACKSON 2,545,923
HYDROSTATIC WEIGHING SCALE
Filed Jan. 17, 1948 2 Sheets-Sheet 1
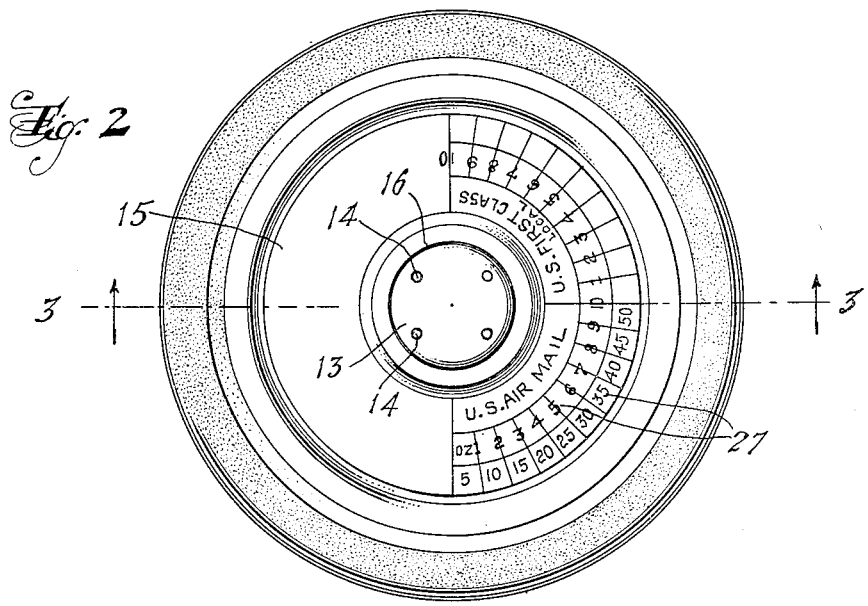
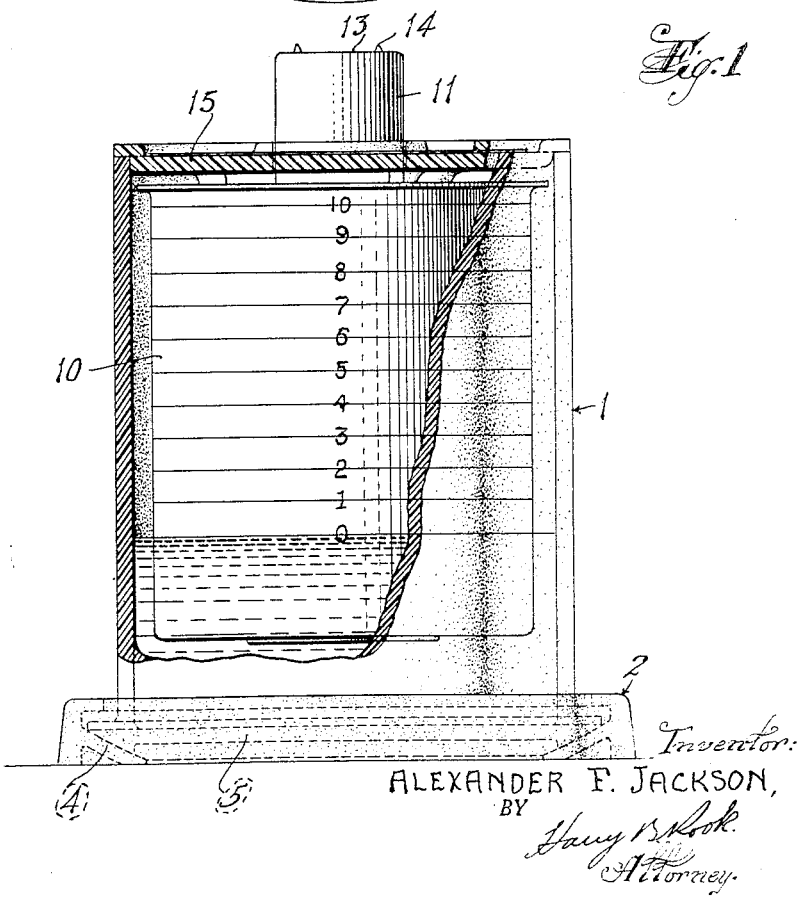
Inventor:
ALEXANDER F. JACKSON,
BY
Harry B. Rook.
Attorney.

March 20, 1951 · A. F. JACKSON · 2,545,923
HYDROSTATIC WEIGHING SCALE
Filed Jan. 17, 1948 · 2 Sheets-Sheet 2

Inventor:
ALEXANDER F. JACKSON,
By Harry B. Cook,
Attorney.

Patented Mar. 20, 1951

2,545,923

UNITED STATES PATENT OFFICE 2,545,923

HYDROSTATIC WEIGHING SCALE

Alexander F. Jackson, East Orange, N. J.

Application January 17, 1948, Serial No. 2,930

5 Claims. (Cl. 265—43)

This invention relates generally to weighing scales, and more particularly to a hydrostatic weighing scale which utilizes the "law of displacement of a floating body," that is, the rule that a body floating in a liquid loses in weight the weight of the volume of such liquid displacement.

In its broader aspects, the invention contemplates a cylindrical cup-shaped plunger-float having an anvil or pan to receive articles to be weighed, and novel and improved means for guiding said float in a true vertical movement and for ensuring the least possible friction in the guiding means. The accuracy of weighing with this device depends on the amount of the immersion of the plunger into its supporting liquid which is shown by the liquid surface contact with the plunger. The plunger is provided with a graduated scale which preferably consists of continuous circumferential lines, and the plunger's weight (with nothing to weigh on its anvil) is shown by the "zero" of the graduated scale. Therefore, anything added to the plunger's weight, for example, by an article placed on said anvil, will be accurately weighed as the additional immersion of the plunger into the liquid indicates on the scale.

Another object is to provide a neat, simple and compact means for weighing in the manner hereinbefore described, which shall comprise an outer vessel or container with transparent walls, in which shall be mounted novel and improved means for supporting and guiding said plunger-float, and a novel supporting base for said container whereby the latter can be accurately adjusted to ensure true vertical movement of said plunger-float.

A further object is to provide a weighing scale of this character which shall embody novel and improved features of construction, whereby a minimum of liquid shall be required and the weighing of an article shall not be dependent on the exact volume of the liquid in the container as long as there is enough liquid to permit the plunger with its maximum load to float.

Another object is to provide novel and improved means for adjusting the plunger axis to a true vertical position.

A further object is to provide novel means to facilitate the positioning of articles to be weighed on the scale, particularly cylindrical articles of different diameters, such as mailing tubes.

Still another object is to provide a weighing scale of this type that is accurate, simple in construction and inexpensive to manufacture.

Other objects and advantages of the invention will be apparent from the description thereof to follow taken in connection with the accompanying drawings, in which Figure 1 is a front elevational view of a weighing scale embodying my invention, parts being broken away;

Figure 2 is a top plan view thereof;

Figure 4:
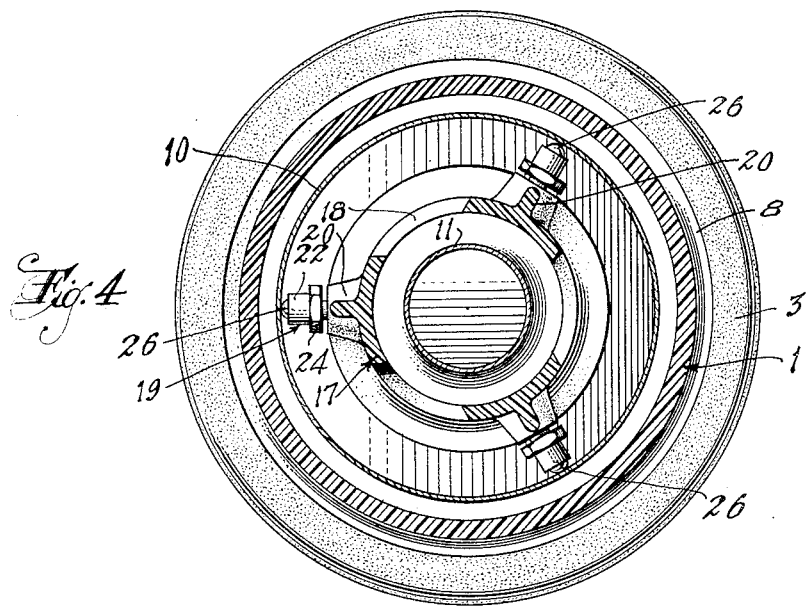
Figure 4 is a horizontal sectional view, taken on the plane of the line 4—4 of Figure 3.
Figure 3:
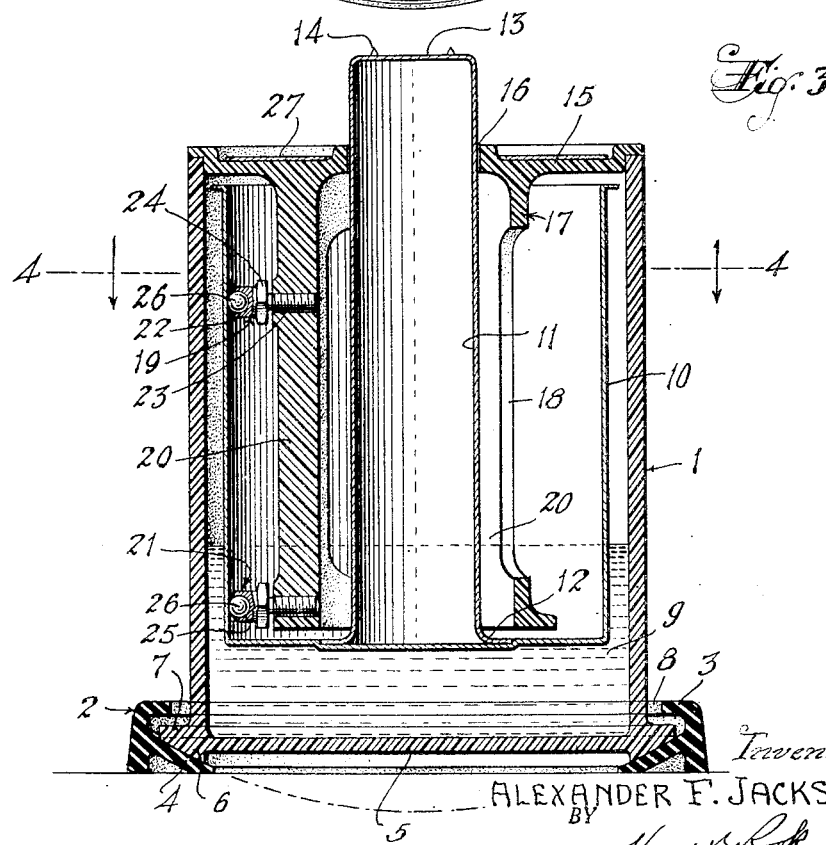
Figure 3 is a vertical sectional view, taken on the plane of the line 3—3 of Figure 2.

As shown in the drawings, the scale comprises an outer cup-shaped vessel 1 of transparent plastic or other suitable transparent material seated on an annular base 2 of rubber of suitable density.

The base is formed with an inwardly extending retaining flange 3 at its upper edge and another supporting flange 4 midway its height of larger area than the flange 3 and slightly curved downwardly and inwardly with a segmental spherical upper face.

The outer vessel 1 is formed with an integral bottom wall 5 having an enlarged peripheral edge portion 6 suitably extended into a peripheral flange 7 of the vessel 1. The bottom surface of the enlarged portion 6 is shaped to conform to the spherical shape of the flange 4 of the base upon which it rests. A space 8 is provided between the outer vessel 1 and the inner edge of the flange 3 of the base so that the outer vessel can be tilted slightly upon its seat on the base in any direction should the surface upon which the base rests be slightly off the horizontal, the contact of the liquid with the plunger's circumferentially continuous measuring lines (hereinafter specifically described) indicating the true vertical positioning.

The outer vessel is partly filled with a quantity of a selected liquid 9, for example, water.

A cup-shaped float or plunger 10 is positioned inside the outer vessel or container and is partly submerged in the liquid. A tubular member or stem 11 is mounted centrally on the bottom wall of the plunger with its lower flared edge 12 welded or otherwise suitably fastened to a central countersunk portion of the bottom wall. The tubular member extends upwardly above the open top end of the plunger and its top end is closed by a wall 13 which serves as a scale pan or anvil for supporting the article or articles to be weighed. Wall 13 is provided with upward projections 14 unequally spaced in pairs thereabout for properly positioning the article or articles to be weighed, such as flat or tubular articles. In crosssection the cylindrical diameter of the plunger is the same throughout its height.

The outer surface of the wall of the plunger 10 is provided with a graduated scale consisting of continuous circumferential lines, the zero or minimum weighing line of which is at the level of the liquid when the device is not in use as shown in Figure 1.

When an article to be weighed is placed on the scale pan 13, the plunger 10 is moved farther downwardly into the liquid, thereby displacing more liquid and thus raising the level of the liquid which in conjunction with the scale on the plunger measures the weight of the article.

In order to center the plunger in the outer vessel or container and to guide its up and down movements, the outer vessel is provided with a tightly fitting cover member 15 of a suitable material for supporting, centering and guiding devices for the plunger. An opening 16 is formed in the center of the cover member and depending from the underside of the cover member around said opening is an integrally formed tubular stem 17 with a plurality of spaced elongated openings 18 near the lower end when desired for reducing the weight of the device.

An upper series of three adjustable metal guiding and centering devices 19 are supported by equally spaced perforated ear or bracket portions 20 formed integrally on the wall of the tubular stem 17 between the openings 18 adjacent its upper end. A lower series of three similarly constructed and mounted guiding and centering devices 21 is positioned directly below the upper series. Each guiding and centering device comprises a cylindrical body portion 22 and a screw threaded stem 23 integral therewith to be screwed into the bracket portion 20. An integral nut section 24 is provided between the body portion and stem to facilitate turning of the device. The body portion 22 is recessed, as indicated at 25, to rotatably receive and support a ball 26 which is retained in the socket by an inturned rim on the body portion.

The central tubular member 11 of the plunger extends freely through the opening 16 in the cover member 15 and protrudes thereabove and does not touch the cover member in its movements. The guiding and centering devices 19 and 21 are so arranged and disposed relative to the plunger 10 that the plunger is guided solely by the contacting balls 26 and practically only three of said balls, one upper and two lower or two upper and one lower, touch the wall of the vessel at any one time. The plunger is adapted to rotate about its axis whereby its points of contact with the balls will change continuously and the balls in their retaining sockets can constantly change or shift.

The area of the wall 13 is proportioned so as to insure that the center of gravity of the article being weighed falls close to the central axis of the plunger thereby minimizing any friction at the points of contact of the plunger with the balls. The area of the wall 13 is shown as less than one-sixth of the plunger area.

The guiding and centering devices are positioned within the air space of the plunger and are protected from oxidation, amalgamation or corrosion by the liquid and so that they can be readily and suitably lubricated. Furthermore, the arrangement of the guide devices within the plunger leaves the outside surface of the plunger 10 free and clear for the graduations so that the latter can be easily read; and in case the graduations are formed by grooves in the outer surface of the plunger, there is no danger of the guiding device becoming caught in such grooves in such a way as to interfere with accurate movement of the plunger. Also the tubular stem 17 projecting from the tightly fitting cover into the outer vessel 1 in surrounding relation to the opening 16 in the cover prevents the spillage of liquid from the outer vessel in case the scale is tipped over.

Through calculation of plunger diameter for the specific liquid used, the article to be weighed gets its reading at the line of contact of the liquid with the wall of the plunger 10. This requires that only the plunger and the adjustment of its guiding means need be accurate in order to insure accuracy in the weighing.

On the top surface of the cover member 15, a circular chart 27 in the form of a decalcomania transfer may be removably mounted (only half is shown). This chart contains various postage rates or any other desired indicia.

It will be understood that this improved weighing mechanism is not limited to use of the plunger and liquid in a confined vessel or container, such as the outer container 1 as shown, but may be used with the plunger immersed in larger bodies of liquid, i. e., the weighing is not dependent upon the exact volume of liquid surrounding the plunger.

Changes in details might also be made without departing from the principle or scope of the invention.

Having thus described the invention, what I claim is:

1. A hydrostatic weighing scale comprising a cup-shaped outer vessel containing a supply of liquid, a cover member tightly fitted upon the open end of the outer vessel, said cover having a central opening, a tubular stem depending from the cover member around said opening, a cup-shaped plunger member inside said vessel having its bottom end submerged in said liquid, a tubular member supported centrally on the bottom wall of the plunger member and extending upwardly therefrom and through the tubular stem and opening in the cover member to a point above the cover member, a wall closing the upper end of said tubular member adapted to support an article to be weighed, there being a graduated scale carried by said plunger member adapted to coact with the level of the liquid for measuring the weight of the supported article and spaced ball members supported by said tubular stem in a manner adapted to engage the inner surface of the plunger member for centering said plunger member in the outer vessel and for guiding its movements up and down in the liquid.

2. A hydrostatic weighing scale comprising a cup-shaped outer vessel containing a supply of liquid, a cover member tightly fitted upon the open end of the outer vessel, said cover member having a central opening, a tubular stem depending from the cover member around said opening, a cup-shaped plunger member inside said vessel having its bottom end submerged in said liquid, a tubular member supported centrally on the bottom wall of the plunger member and extending upwardly therefrom and through the tubular stem and opening in the cover member, a wall closing the upper end of said tubular member and adapted to support an article to be weighed, there being a graduated scale carried by said plunger member adapted to coact with the level of the liquid for measuring the weight of the supported article, and devices for centering and guiding the plunger member including spaced brackets on the tubular stem adjacent its upper end and adjacent its lower end and ball members rotatably supported by said brackets and adapted to engage the inner surface of the plunger member.

3. A hydrostatic weighing scale comprising an outer vessel containing liquid and having a tight fitting cover provided with a central opening, a cup-shaped plunger inside said vessel having its bottom end submerged in said liquid, a stem carried by said plunger in spaced relation to the side wall of the plunger and extending upwardly through said opening in the cover with its upper end formed to support an article to be weighed, there being a graduated scale on the plunger to coact with the level of said liquid for measuring the weight of the supported article, and means depending from said cover into the space between said stem and the side wall of said plunger and engaging the interior of the plunger wall for centering the plunger and guiding its movements.

4. A hydrostatic scale as defined in claim 3 wherein the last named means comprises a tubular portion, spaced brackets extending radially therefrom in spaced relation circumferentially thereof and balls rotatably supported by said brackets for frictionally engaging the inner surface of the plunger wall.

5. A hydrostatic weighing scale comprising an outer vessel containing liquid and having a tight fitting cover provided with a central opening, a cup-shaped plunger inside said vessel having its bottom end submerged in said liquid, and having a coaxial stem in spaced relation to its side wall and extending upwardly through said opening in the cover with its upper end formed to support an article to be weighed, there being a graduated scale on the plunger to coact with the level of said liquid for measuring the weight of the supported article, and centering and guiding means for said plunger carried by said cover and extending into the space between said stem and said side wall of the plunger.

ALEXANDER F. JACKSON.

REFERENCES CITED

The following references are of record in the file of this patent:

UNITED STATES PATENTS

| Number | Name | Date |
| --- | --- | --- |
| 232,245 | Deschamps | Sept. 14, 1880 |
| 2,487,664 | Morgan | Nov. 8, 1948 |

FOREIGN PATENTS

| Number | Country | Date |
| --- | --- | --- |
| 3,171 of 1879 | Great Britain | Aug. 7, 1879 |
| 16,403 | Great Britain | July 23, 1902 |